(12) United States Patent
Berndt

(10) Patent No.: US 6,305,089 B1
(45) Date of Patent: Oct. 23, 2001

(54) CUTTING GUIDE

(75) Inventor: Timothy S. Berndt, Whitmore Lake, MI (US)

(73) Assignee: ISX Company, Whitmore Lake, MI (US)

( * ) Notice: Subject to any disclaimer, the term of this patent is extended or adjusted under 35 U.S.C. 154(b) by 0 days.

(21) Appl. No.: 09/466,682

(22) Filed: Dec. 20, 1999

(51) Int. Cl.$^7$ ........................................ B27B 11/02
(52) U.S. Cl. ........................................ 30/374; 30/375
(58) Field of Search ........................ 30/286, 289, 370, 30/371, 374, 375

(56) References Cited

U.S. PATENT DOCUMENTS

| | | | |
|---|---|---|---|
| 2,627,657 | * | 2/1953 | Etchen . |
| 2,996,089 | * | 8/1961 | McCarty . |
| 4,061,065 | | 12/1977 | Arriola ................................. 83/562 |
| 4,148,142 | | 4/1979 | Sullivan et al. ..................... 30/293 |
| 4,245,390 | * | 1/1981 | Bond .................................... 30/374 |
| 4,275,501 | * | 6/1981 | Haire ................................... 30/374 |
| 4,334,356 | * | 6/1982 | Korsunger ........................... 30/374 |
| 4,373,264 | * | 2/1983 | Hamaker ............................. 30/374 |
| 4,620,368 | | 11/1986 | Bowman ............................. 30/294 |
| 4,922,616 | * | 5/1990 | Bensel ................................. 30/374 |
| 5,044,081 | | 9/1991 | Nguyen ............................... 30/294 |
| 5,404,778 | | 4/1995 | Ward ................................... 30/289 |
| 5,485,676 | | 1/1996 | Terhorst .............................. 30/294 |
| 5,535,520 | * | 7/1996 | Armstrong .......................... 30/375 |

* cited by examiner

*Primary Examiner*—Hwei-Slu Payer
(74) *Attorney, Agent, or Firm*—Sonnenschein Nath & Rosenthal

(57) ABSTRACT

A cutting guide for use with a cutting device having a blade is provided. The cutting guide includes a bracket for securing the guide to the cutting device, a base connected to the bracket for supporting mounting stresses of the bracket, an ankle having a blade receiving and aligning slot and a flexure connecting the base to the ankle, thereby providing a cutting guide that can sustain high levels of force yet retain lateral flexibility. The width of the flexure is slightly greater than the width of the blade of the cutting device, thereby allowing the cutting device employing the cutting guide to cut any kind of material that would otherwise require a workbench.

16 Claims, 5 Drawing Sheets

CUTTING GUIDE

BACKGROUND OF THE INVENTION

A. Field of the Invention

The present invention relates generally to a cutting guide, and particularly to a cutting guide for use with a cutting device having a reciprocating blade. The cutting guide is capable of sustaining high levels of stress while maintaining lateral flexibility allowing a user to easily cut polycarbite structured back carpeting or multiple layers of non-structured back carpeting while increasing the life of the blade.

B. Prior Art

Traditional carpet cutting techniques utilize a hand-held carpet knife. Such a carpet knife is a metal or wood tool that clamps a razor sharp blade. In operation, the user draws the hand-held carpet knife towards or parallel to their body over the length of the carpet being cut. The blade of the carpet knife rides on the flooring beneath the carpet or floor covering being cut during this operation. A major problem encountered by users of traditional hand-held carpet knives is the significant cost of blade replacement. Continuous contact with the floor during traditional carpet cutting techniques dulls and damages the tip of the blade requiring blade replacement approximately every fifty (50) feet. Yet, those skilled in the art of carpet cutting understand that the use of a hand-held carpet knife has become an industry standard and the industry has accepted the cost of repeated blade replacement.

Another problem encountered by users of carpet cutting tools involves cutting multiple layers of non-structured back carpeting. Traditional techniques for cutting multiple pieces of non-structured back carpeting simultaneously requires the use of any one of a number of manually operated hand seam cutting tools such as a cushioned back cutter, a top cutter, a block cutter or a glass type cutter. A skilled user, however, is needed to operate these tools. In fact, the multi-layered carpet cutting techniques require journeyman level experience to successfully perform. Thus, there is considerable training expense and training time required for obtaining a competent cutter of multiple layers of non-structured back carpeting.

Yet another problem encountered by users of carpet cutting tools involves simultaneous or double cutting structured back floor coverings containing polycarbite. Because traditional methods for cutting polycarbite back floor coverings have been unsuccessful, trace cutting has been utilized. Trace cutting is accomplished by first cutting along a tufted row of the first side of structured back carpeting utilizing a carpet knife, top cutter, cushioned back cutter or loop pile cutter. This creates a trim seam edge for cutting the second side. Then the trim seam edge of the first side is used as a guide for cutting the second side. The problem encountered using this method, however, is that the second side will not necessarily fall in line with the tufted row cut on the first side. Another problem is that trace cutting polycarbite structured back floor coverings is only achievable following the trace cutting method when using the manually operated "Gundlach model 295 Unicutter." As is apparent to those skilled in the art, the trace cutting method is time consuming because the user must cut one side of the carpet and then the other side rather than accomplishing the entire operation in one pass.

It is therefore apparent that a cutting guide for use with a cutting device is not only necessary for reducing the cost of blade replacement during carpet cutting techniques, but also for cutting structured back carpeting as well as multi-layered non-structured back carpeting in one pass.

Accordingly, it is a primary object of the invention to provide a cutting guide attachable to a cutting device having a blade, for adequate double cutting of a polycarbite structured back carpeting.

It is another object of the present invention to provide a cutting guide for adequate cutting of multi-layered non-structured back carpeting.

It is another object of the present invention to provide a cutting guide for use with a cutting device having a blade that reduces damage and wear on the blade.

It is yet another object of the present invention to provide a cutting guide for use with a cutting device having a blade that requires a minimum of training to operate when cutting multiple layers of non-structured back carpeting.

These and other objects and advantages will be apparent from the following description of the illustrated embodiment and the attached drawings.

SUMMARY OF THE INVENTION

A cutting guide for use with a cutting device having a blade is provided. The cutting guide includes a bracket for securing the guide to the cutting device, a base connected to the bracket for supporting mounting stresses of the bracket, an ankle having a blade receiving and aligning slot and a flexure connecting the base to the ankle, providing a cutting guide that can sustain high levels of force yet retain lateral flexibility. The width of the flexure is slightly greater than the width of the blade of the cutting device, thereby allowing the cutting device employing the cutting guide to cut any kind of material that would otherwise require a workbench.

DETAILED DESCRIPTION OF PREFERRED EMBODIMENTS

Figure 1:
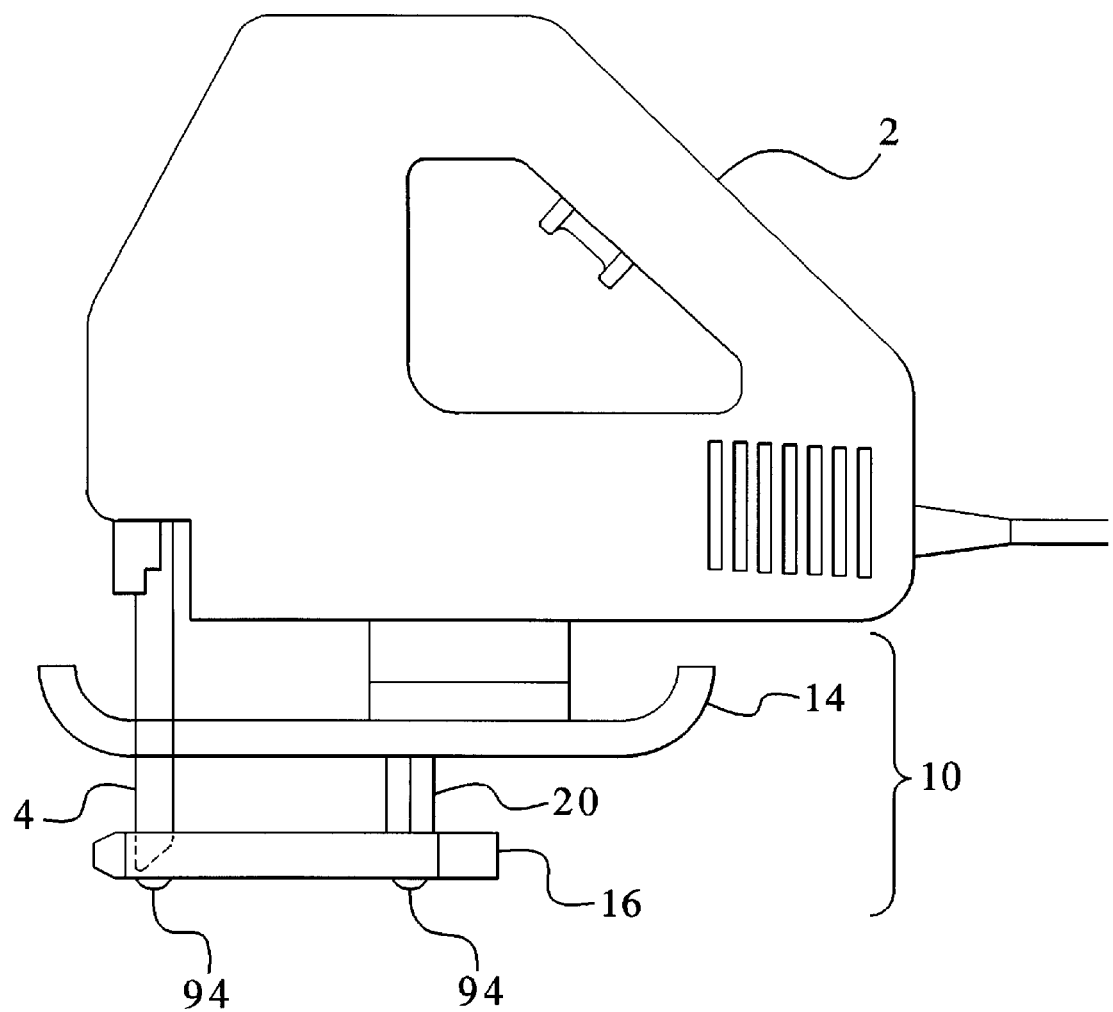
FIG. 1 is a front plan view of the cutting guide of the present invention attached to a cutting device such as a reciprocating blade or knife.
Figure 2:
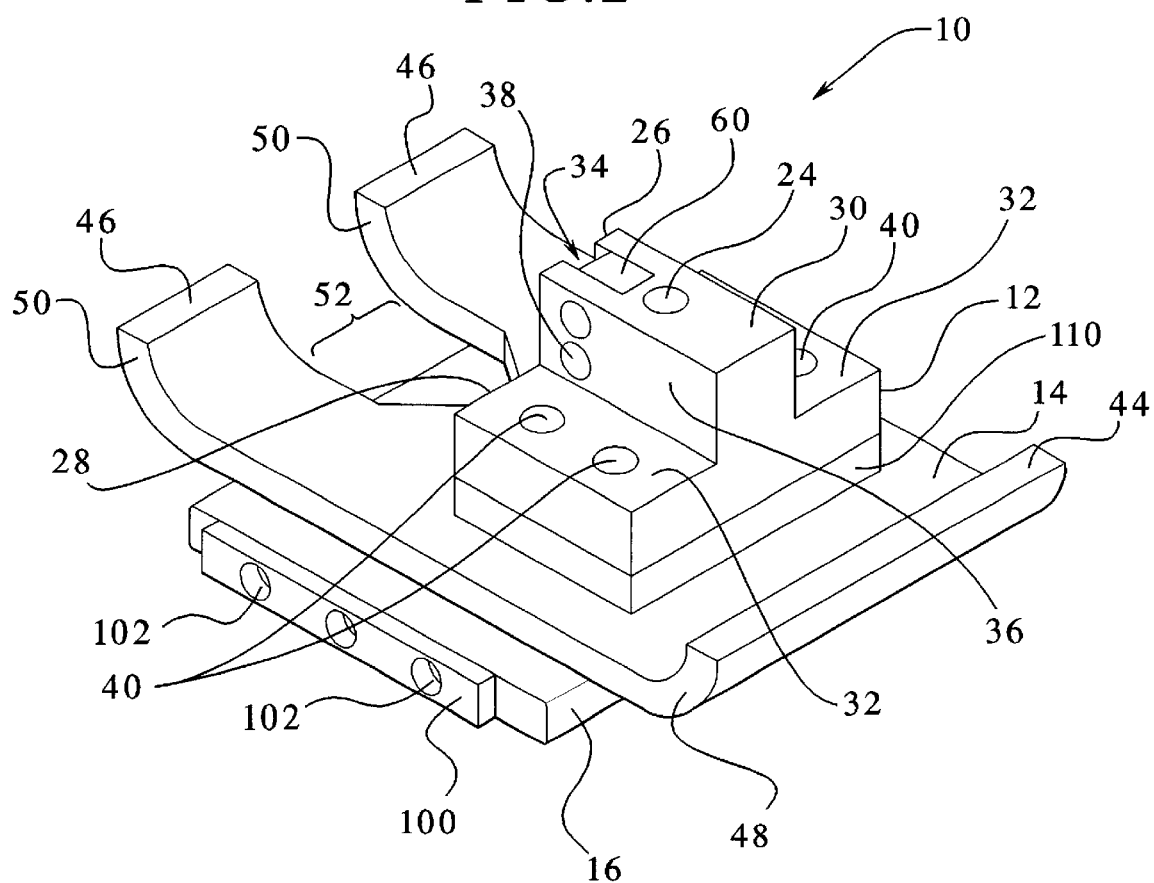
FIG. 2 is a rear perspective view of the present invention.
Figure 3:
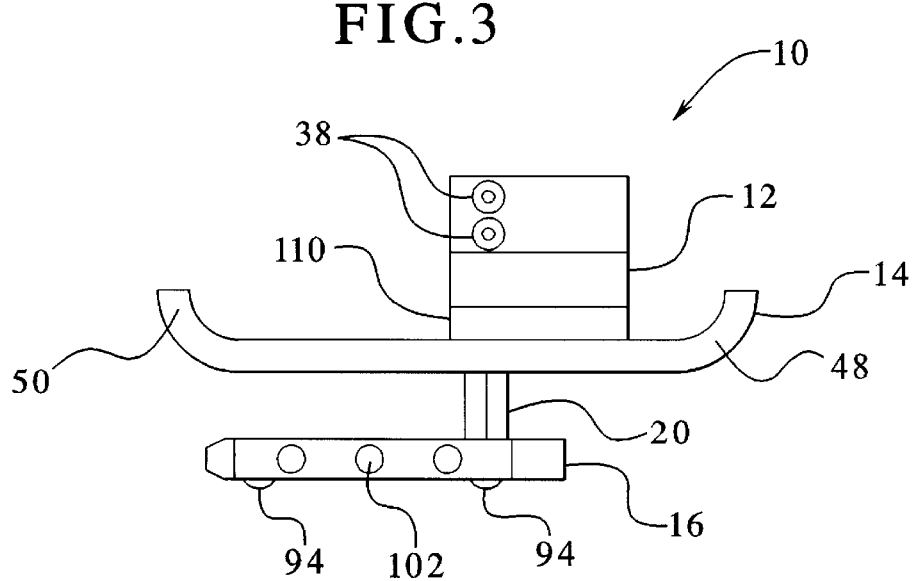
FIG. 3 is a side elevation view of the invention as shown in FIG. 2.
Figure 4:
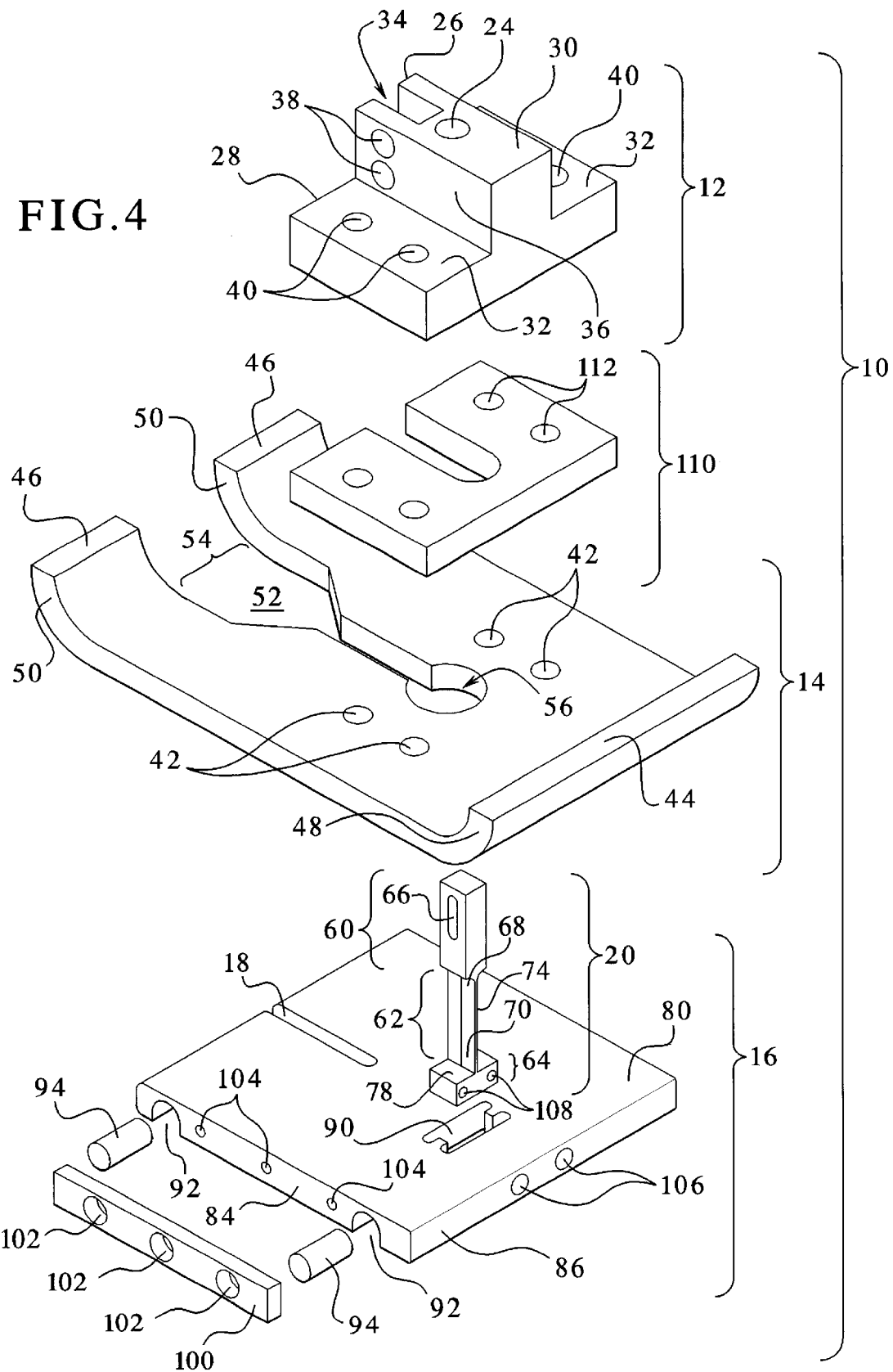
FIG. 4 is an exploded view of the present invention of FIG. 2.

As shown in FIGS. 1, 2, 3 and 4, a cutting guide 10 is provided having a bracket 12, a base 14 connected to the bracket 12, an ankle 16 having a blade receiving and aligning slot 18 (FIG. 6), and a flexure 20 connecting the base 14 to the ankle 16 at a predetermined distance. The cutting guide 10 attaches to the bottom of a cutting device 2, which may include a reciprocating knife, by means of a standard retaining bolt (not shown) provided with the cutting device 2 and holding the base 14 to a bottom of the housing of cutting device 2. As shown in FIGS. 2 and 4, the retaining bolt (not shown) passes through a cylindrical bore 24 in the bracket 12. The cylindrical bore 24 of the bracket 12 is counter bored, allowing the retaining bolt (not shown) to be recessed within the bracket 12 preventing the retaining bolt (not shown) from interfering with the flooring material or the operation of the cutting device 2. Although the use of the bracket 12 is preferred, it is understood by those skilled in the art that other means for attaching the base 14 to a cutting device 2 may be employed thereby eliminating the need for a bracket 12.

As shown in FIGS. 2, 3 and 4, the bracket 12 is an inverted T-shaped structure having a flange portion 26 dividing a platform portion 28 into two sections. The cylindrical bore 24 extends from the top surface 30 of the flange portion 26, through the flange portion 26 into the platform portion 28, and out of the bottom surface (not shown) of the platform portion 28. Also, extending from the top surface 30 of the flange portion 26 to the bottom surface (not shown) of the platform portion 28 is a slot 34 for receiving the upper portion 60 of the flexure 20. Flange portion 26 has first side surface 36 and an opposite second side surface (not shown). First side surface 36 of flange portion 26 has two apertures 38 each for receiving a screw (not shown) for holding flexure 20 within the slot 34 of the bracket 12. Each aperture 38 corresponds with a threaded aperture (not shown) on second side surface of flange portion 26 such that a screw inserted through an aperture 38 of first side surface 36 of flange portion 26 of bracket 12 passes through flexure 20 contained in slot 34 and is received in a threaded aperture on the second side surface, removably and adjustably securing flexure 20 within slot 34 of bracket 12. While this method of securing flexure 20 within slot 34 of bracket 12 is preferred, it is understood that more or fewer apertures 38 may be employed and other means for fastening, such as rivets or bolts, may be employed. The bracket 12 is preferably made of aluminum, although any appropriate material may be employed.

As shown in FIGS. 2 and 4, top surface 32 of each section of platform portion 28 of bracket 12 has two recessed cylindrical bores 40 corresponding with threaded apertures 42 of the base 14. Recessed cylindrical bores 40 are of sufficient diameter to receive screws, for attaching base 14 to bracket 12. It is understood by those skilled in the art that many other means for attaching base 14 to bracket 12 may be employed, for example providing an elongated rectangular section on the top surface 32 of each section of platform portion 28 having a cylindrical bore 40 therethrough for receiving a screw attaching bracket 12 to base 14.

As shown in FIGS. 2, 3 and 4, attached to the bracket 12 is a base 14. The base 14 is generally sled-shaped having first and second ends 44, 46. The first end 44 of the base 14 has a curved lip 48 that extends the entire length of the first end 44 of the base 14. Two curved lips 50 at the second end 46 of the base 14 define a slot 52. While it is understood that base 14 may be any appropriate shape, the sled shape is preferred because the curved lips 48, 50 allow material being cut to move smoothly through the cutting guide 10. Slot 52 is preferably bell-shaped, although any other shape necessary for receiving the blade of a cutting device 2 may be used. The bell-shaped slot 52 has first and second ends 54, 56 (FIG. 4). First end 54 of bell-shaped slot 52 is open and is wider than second end 56 of bell-shaped slot 52. Second end 56 of bell-shaped slot 52 is preferably circular and sized to fit the retaining bolt (not shown) extending through cylindrical bore 24 of the bracket 12. While any appropriate means for attaching base 14 to bracket 12 may be employed, it is preferred that the base 14 has four threaded apertures 42 each corresponding to one of the four recessed cylindrical bores 40 of the platform portion 28 of bracket 12. Screws or other suitable fastener elements are placed through the recessed cylindrical bores 40 of the platform portion 28 of bracket 12, and into the threaded apertures 42 of the base 14 threadedly engaging the base 14 to the bottom surface of the bracket 12. The base 14 provides balance and a load-bearing surface for the cutting guide 10 when used with the cutting device 2. The base 14 has a low friction surface and is lightweight. The material used in manufacturing the base 14 is hardened to minimize wear and support the mounting stresses of the bracket 12. The base 14 is preferably made of an aluminum plate, however any appropriate material may be employed.

As shown in FIGS. 3 and 4, attached within the slot 34 of the bracket 12 is a flexure 20. The flexure 20 is an elongated inverted T-shaped member having an upper portion 60, middle portion 62, and a lower portion 64. The upper portion 60 of flexure 20 is an elongated rectangular flange of sufficient size and dimension to snugly fit within the corresponding slot 34 of the bracket 12. The upper portion 60 of the flexure 20 has a dynamic range slot 66 corresponding to the apertures 38 of the bracket 12 for receiving fastening elements, such as socket head cap screws (not shown). The middle portion 62 of the elongated flexure 20 is an elongated rectangular plate having a first end 68, a second end 70, a front side (not shown) and a rear side 74. First end 68 of the middle portion 62 extends from the bottom surface of upper portion 60 while the second end 70 of the middle portion 62 connects to the center of the top surface 78 of the lower portion 64 of the flexure 20. The front side of the middle portion 62 is beveled while the rear side 74 of the middle portion 62 is flat. The lower portion 64 is a rectangular block flange oriented perpendicularly in relation to the upper elongated rectangular flange portion 60. The lower portion 64 of the flexure 20 is captured within recess 90 of the ankle 16.

Figure 6:
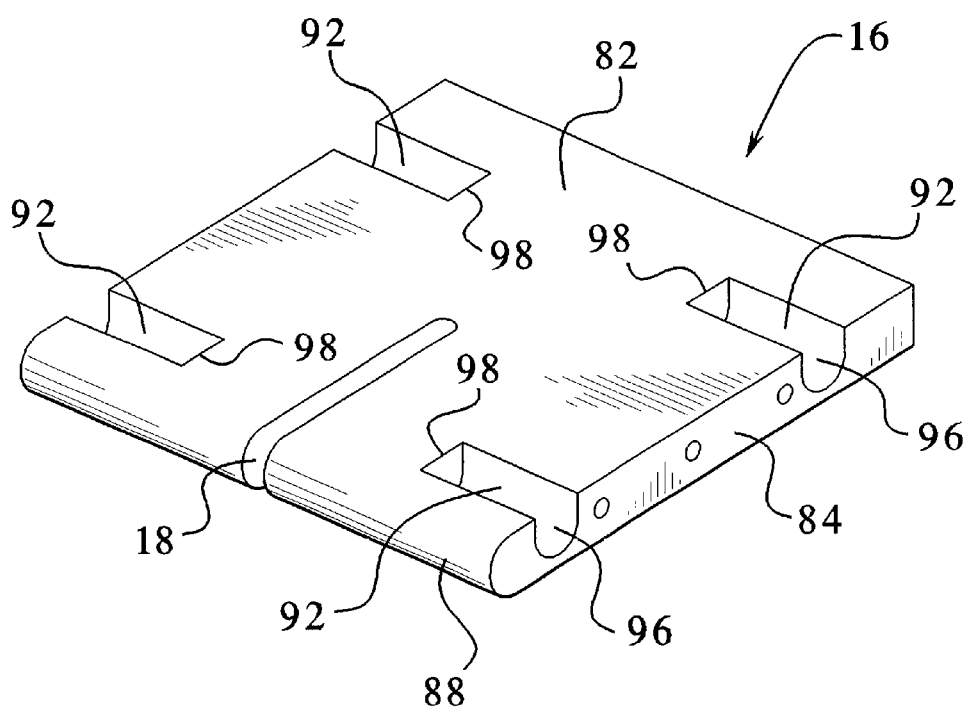
FIG. 6 is a bottom perspective view of the ankle of the present invention as shown in FIG. 4.

As shown in FIGS. 4 and 6, the ankle 16 has a top surface 80, bottom surface 82, two side walls 84, a back wall 86 and a front wall 88. Extending from the middle of the front wall 88 to approximately the center of the ankle 16 is a blade receiving and aligning slot 18. On the top surface 80 approximately halfway between side walls 84 of the ankle 16, in alignment with the slot 18, is a butterfly-shaped recess 90 for receiving the lower portion 64 of the flexure 20. The recess 90 does not extend completely through ankle 16, but is of sufficient dimension to receive the lower portion 64 of the flexure 20 with a friction fit such that lateral movement of the flexure 20 is prevented and a high tolerance is maintained, preventing vibration from loosening the cutting guide assembly 10 during operation of a cutting device 2. The flexure 20 connects the ankle 16 to the base 14 and maintains perpendicularity between the ankle 16 and the base 14. The strength of the flexure 20 is such that the load on the ankle 16 and base 14 will not deteriorate the flexure 20. The flexure 20 is preferably made of tungsten, although any appropriate equivalent material may be employed.

As shown in FIGS. 4 and 6, the bottom surface 82 of the ankle 16 contains four over one hundred and eighty degree (180°) recesses 92, each for rotatably holding a roller 94 within each recess 92. The recesses 92 on the bottom surface 82 have openings 96 on the side walls 84 for receiving the rollers 94. The recesses 92 are of sufficient width to rotatably fit the rollers 94. The second ends 98 of the recesses 92 are closed. The rollers 94 are of sufficient dimension to be removably replaced within the recesses 92 through each opening 96 in the side walls 84, yet rotate within the recess 92 without falling out of the recess 92 when the cutting guide 10 is in operation. Plate retainers 100 are provided having this same width and height of the side wall 84 to removably cover the openings 96 of the recesses 92 on the bottom surface 82 of the ankle 16, thus capturing the rollers 94 within the recesses 92. Plate retainers 100 are preferably made of aluminum, although any appropriate material may be employed. The rollers 94 are free floating, made of solid stainless steel and are elongated solid cylinders. The rollers 94 minimize friction between the floor and the carpet scrim, and allow ease of maintenance of the cutting guide 10. The plate retainers 100 each have three apertures 102 corresponding to three threaded apertures 104 within the side walls 84 of the ankle 16 for receiving captive head screws for removably affixing the plate retainers 100 to the side walls 84.

The back wall 86 of the ankle 16 has two recessed threaded apertures 106 corresponding to two threaded apertures 108 within the lower portion 64 of the flexure 20 for receiving captive head screws for affixing the lower portion 64 of the flexure 20 within the butterfly recess 90 of the ankle 16. The ankle 16 provides the lower load bearing separation surface between the top of the floor and the bottom of the structured back carpeting. The ankle 16 is preferably made of aluminum, however any appropriate material may be employed.

As shown in FIG. 6, the front wall 88 of the ankle 16 is beveled and angled to provide ease of use. The slot 18 within the ankle 16 allows the reciprocating cutting blade (not shown) to pass through. However, the blade does not extend downward beyond the bottom surface of ankle 16 so as not to damage the floor on which the carpet sits. The width of the blade receiving and aligning slot 18 within the ankle 16 also prevents the reciprocating blade from skewing during serpentine cutting techniques.

Figure 5:
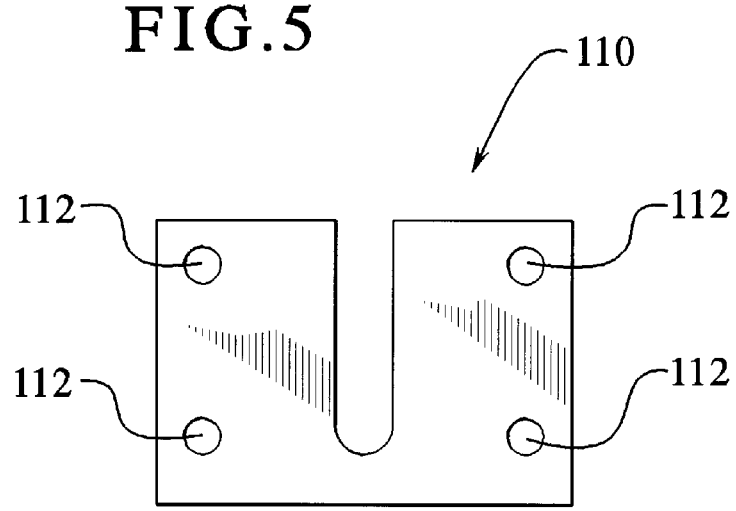
FIG. 5 is a bottom view of the bracket of the present invention as shown in FIG. 4.

As shown in FIGS. 4 and 5, optionally provided are U-shaped spacers 110 that may be placed between the bracket 12 and the base 14. While it is preferred to place U-shaped spacers 110 between the bracket 12 and the base 14, they may be placed on the bottom surface of base 14 or the top surface 80 of the ankle 16. The U-shaped spacers 110 have four apertures 112 corresponding to the four apertures 42 on the base 14 for allowing screws or other fastening elements affixing the bracket 12 to the base 14 to pass through the spacers 110, thus attaching the spacer 110 between the bracket 12 and the base 14. The spacer 110 may vary in thickness to allow for large thickness adjustments of the carpet to be cut. U-shaped spacers 110 are preferably made of aluminum, although any appropriate material may be employed.

Figure 7:
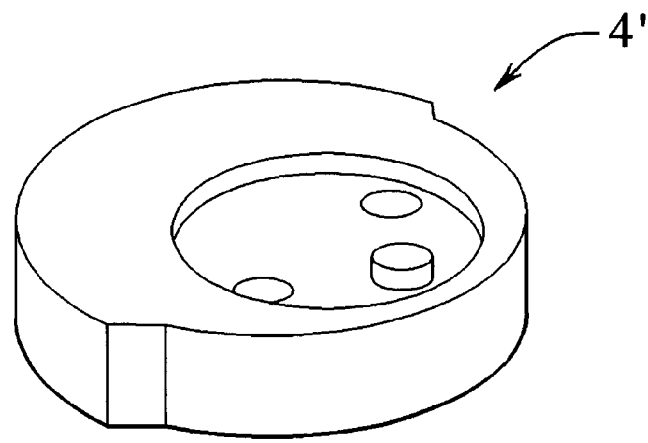
FIG. 7 is a plan perspective view of a cam element used in connection with the cutting device in FIG. 1.
Figure 8:
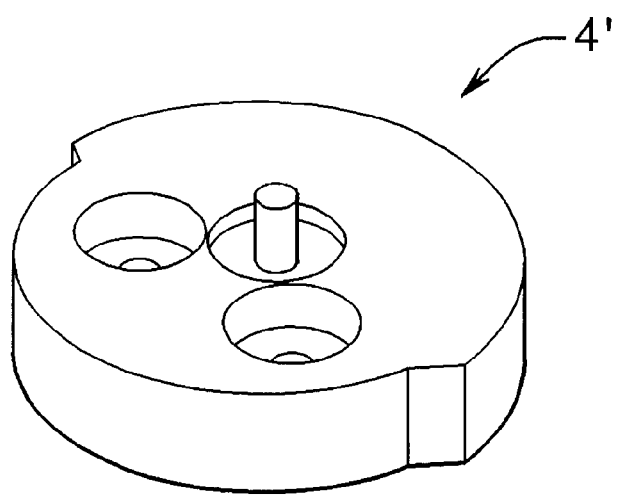
FIG. 8 is a bottom perspective view of the cam element shown in FIG. 7.

To achieve the lowest angle between the overlapped carpet surfaces to be cut, the cutting base 14 has been designed to ride as close to the floor without interfering with temperature requirements and blade performance. The cutting device 2 in turn is modified to reduce the stroke of the cutting because of the proximity to the floor. Accordingly, as shown in FIGS. 7 and 8, cam 4' of cutting device 2 reduces the stroke to 0.250 inches, also called a quarter-inch throw, which is the optimal blade stroke for keeping temperature from severely affecting performance. The quarter-inch throw is necessary to prevent the cutting device from cutting too far off the floor. Cam 4' is preferably made of steel, although any appropriate material may be employed.

As shown in FIGS. 1 and 2, the cutting blade 4 attached to the cutting device 2 passes through the base 14 and into the ankle 16 through the blade receiving and aligning slot 18 of the ankle 16. As shown in FIGS. 2, 3 and 4, the blade receiving and aligning slot 18 of the ankle 16 provides a guide for the cutting blade 4 while the ankle 16 protects the cutting blade 4 from striking the floor or cutting surface. The bracket 12 mounts the base 14 to the bottom of the cutting device 2. The ankle 16 is attached to the base 14 via keyed butterfly shaped mounting recess 90 on the top surface 80 of ankle 16 with flexure 20. The flexure 20 is attached to the bracket 12 via clamping dynamic range slot 34 of bracket 12 and captive head screws (not shown). The slot 34 of bracket 12 allows for minor adjustments of the space between the base 14 and the ankle 16 to accommodate minor variations in carpet thickness. The distance between the bottom of the base 14 and the top of the ankle 16 is adjusted by sliding the upper portion 60 of the flexure 20 up into the slot 34 of bracket 12 over its dynamic range and locking the flexure 20 in place with captive head screws (not shown). Optional spacers 110 are provided in multiple thicknesses to allow for larger thickness adjustments.

As shown in FIGS. 1, 2 and 3, in operation, the cutting guide 10 is attached to the bottom of a cutting device 2 via a standard retaining bolt (not shown). It is preferred to utilize the cutting guide 10 in conjunction with a standard industrial reciprocating knife, although the cutting guide 10 may be interfaced with any reciprocating knife or cutting device. A double layer of carpet is fed through the cutting guide 10 from the front in the eventual space between the base 14 and the ankle 16, whereby the reciprocating blade 4 of the cutting device 2 cuts the carpet. The flexure 20 separates the carpet along a line having a width slightly greater than that of the blade 4, reducing friction and thermal build-up on the blade 4 of the cutting device 2.

The speed of the reciprocating blade 4 is adjusted to the thickness of the carpet (approximately 700 cpm). The reciprocating blade 4 is easily used with the cutting guide 10. The operator of the cutting device 2 only needs to provide horizontal pressure to move the reciprocating blade 4 through the carpet layers. With a minimal amount of training, any professional carpet installer can competently operate the reciprocating blade 4 with the cutting guide. Only approximately four hours of training is necessary to achieve properly accepted results. In fact, no downward pressure upon the cutting device 2 is necessary with the use of the cutting guide 10 because the weight of the cutting device 2 is sufficient to retain flatness of the cutting device 2 and carpet during operation of the reciprocating blade. The assembly, when attached to the bottom of a modified power tool with this configuration, will properly double cut the structured polycarbite-backed floor coverings.

Other applications of the cutting guide are possible, including industrial and commercial carpentry. Because the width of the flexure 20 is slightly greater than that of the blade 4 of the reciprocating knife, the entire assembly when attached to a cutting device 2 allows similar cutting capability of any material that would otherwise require a workbench.

The foregoing description of the embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and modifications as are suited to the particular use contemplated. It is intended that the scope of the invention not be limited by the specification, but be defined by the claims set forth below.

I claim:

1. A cutting guide for use in connection with a cutting device having a blade, said cutting guide comprising:

a bracket for retaining said cutting guide against said cutting device, said bracket having an adjustment slot and a cylindrical bore, the cylindrical bore being counter-bored for receiving a retaining bolt extending from said cutting device;

a sled-shaped base connected to said bracket having first and second ends, the first end having an upward curved lip, the second end having two upward curved lips defining a bell-shaped slot serving as a blade guide, said slot allowing the blade of the cutting device to pass through said base;

an ankle having top surface, a bottom surface, a front wall and a back wall, the top surface of said ankle having a butterfly-shaped blind retaining recess, the bottom surface having a plurality of rollers rotatably retained within a plurality of recesses on the bottom surface of said ankle, the front wall having a blade receiving and aligning slot extending to approximately the center of said ankle; and an inverted T-shaped flexure having an elongated rectangular flange upper portion, an elongated rectangular plate middle portion and a block flange lower portion, the upper portion extending into the adjustment slot of said bracket, the upper portion having a dynamic range slot for varying the height of said flexure within the adjustment slot of said bracket, the middle portion having front and back sides, the front side of the middle portion being beveled, the back side of the middle portion being flat, the lower portion extending within the blind retaining recess of said ankle, said flexure connecting said base to said ankle at a predetermined distance between said ankle and said base.

2. A cutting guide in combination with a cutting device having a blade, said cutting guide comprising:

a base connected to said cutting device, said base having a blade guide allowing the blade of the cutting device to pass through said base;

an ankle having a blade receiving and aligning slot; and a flexure connecting said base to said ankle at a predetermined distance from each other; and wherein said base has first and second ends, and the blade guide is a slot at the second end of said base.

3. The combination of claim 1 wherein the first and second ends of said base have upward curved lips and the slot is bell-shaped.

4. The combination of claim 1 further comprising:

means for retaining said cutting guide against said cutting device.

5. The combination of claim 4 wherein said retaining means is a bracket having:

an adjustment slot for receiving an upper portion of said flexure; and a cylindrical bore for receiving a retaining bolt of said cutting device for securing said bracket to said cutting device.

6. The combination of claim 5 wherein said bracket is an inverted T-shaped structure.

7. The combination of claim 1 further comprising:

a spacer removably attached to said base for varying the distance between said base and said ankle.

8. The combination of claim 1 further comprising:

a plurality of rollers rotatably affixed to a bottom surface of said ankle.

9. The combination of claim 8 further comprising:

plate retainers removably affixed to side walls of said ankle for capturing the plurality of rollers within a plurality of recesses on the bottom surface of said ankle.

10. The combination of claim 1 wherein said cutting device comprises a cam having a quarter inch stroke for allowing a blade of said cutting device to cut just above the bottom of at least one roller affixed to said ankle, thereby allowing the cutting device to cut accurately while keeping the blade from touching a surface upon which said at least one roller is traveling.

11. The combination of claim 1 wherein said flexure is an inverted T-shaped structure having an elongated rectangular flanged upper portion, an elongated rectangular plate middle portion and a block flange lower portion, the middle portion connecting the upper and lower portions at approximately their midpoint.

12. The combination of claim 11 wherein the upper portion of said flexure further comprises:

a dynamic range slot for varying the distance between said base and said ankle.

13. The combination of claim 11 wherein the middle portion of said flexure has a beveled front side and a flat back side.

14. The combination of claim 1 wherein said ankle further comprises:

a retaining recess located on an upper surface of said ankle for receiving a lower portion of said flexure.

15. The combination of claim 14 wherein said retaining recess is a butterfly-shaped blind retaining recess.

16. The combination of claim 1 wherein the width of the flexure is greater than the width of the blade of said cutting device to enable cutting of any material that would otherwise require a workbench.

* * * * *